United States Patent
Hicks et al.

(10) Patent No.: US 12,039,453 B2
(45) Date of Patent: Jul. 16, 2024

(54) REINFORCEMENT TESTING OF A NEURAL NETWORK

(71) Applicant: INTERNATIONAL BUSINESS MACHINES CORPORATION, Armonk, NY (US)

(72) Inventors: Andrew C. M. Hicks, Highland, NY (US); Deborah A. Furman, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 888 days.

(21) Appl. No.: 17/117,573

(22) Filed: Dec. 10, 2020

(65) Prior Publication Data
US 2022/0188641 A1 Jun. 16, 2022

(51) Int. Cl.
*G06F 11/36* (2006.01)
*G06N 3/086* (2023.01)

(52) U.S. Cl.
CPC ......... *G06N 3/086* (2013.01); *G06F 11/3688* (2013.01)

(58) Field of Classification Search
CPC .................................................. G06F 11/3688
USPC .......................................................... 706/15
See application file for complete search history.

(56) References Cited

U.S. PATENT DOCUMENTS

| | | | |
|---|---|---|---|
| 6,263,325 B1 * | 7/2001 | Yoshida | G06N 3/126 706/12 |
| 9,798,751 B2 | 10/2017 | Birdwell et al. | |
| 10,095,718 B2 | 10/2018 | Birdwell et al. | |
| 10,380,479 B2 | 8/2019 | Chang et al. | |
| 10,657,447 B1 * | 5/2020 | McDonnell | G06N 3/044 |
| 2005/0256814 A1 * | 11/2005 | Ayala | G06N 3/10 706/13 |
| 2005/0273449 A1 * | 12/2005 | Peacock | G06N 3/084 706/16 |
| 2009/0006060 A1 * | 1/2009 | Rhodes | G06N 3/063 703/11 |
| 2017/0103304 A1 * | 4/2017 | Henry | G06N 3/04 |
| 2017/0103308 A1 * | 4/2017 | Chang | G06N 3/045 |
| 2018/0268294 A1 * | 9/2018 | Modha | G06N 3/063 |

(Continued)

OTHER PUBLICATIONS

Behjat, A. et al., "Adaptive Genomic Evolution of Neural Network Topologies (AGENT) for State-to-Action Mapping in Autonomous Agents"; In 2019 International Conference on Robotics and Automation (ICRA) IEEE; Mar. 17, 2019; pp. 9638-9644.

(Continued)

*Primary Examiner* — Reza Nabi
(74) *Attorney, Agent, or Firm* — Cantor Colburn LLP; Teddi Maranzano (57) ABSTRACT

Aspects of the invention include creating a neural network including neurons to which actions are assigned in representation of test cases. Tests of various instantiations of the neural network are executed for each test case and a state of the neural network after each test is evaluated to determine a fitness score of a corresponding instantiation. Instantiations having fitness scores that exceed a predefined level and identified and the instantiations having the fitness scores that exceed the predefined level are selected for adjustments. The executing, the evaluating, the identifying and the selecting are iteratively repeated in order to obtain desired fitness scores.

17 Claims, 7 Drawing Sheets

(56) References Cited

U.S. PATENT DOCUMENTS

| | | | |
|---|---|---|---|
| 2019/0122119 A1* | 4/2019 | Husain | G06N 3/086 |
| 2019/0130277 A1* | 5/2019 | Andoni | G06N 3/086 |
| 2019/0228312 A1* | 7/2019 | Andoni | G06F 18/2433 |
| 2019/0266234 A1* | 8/2019 | Ormerod | G06N 3/08 |
| 2020/0012581 A1* | 1/2020 | Landsborough | G06F 11/3608 |
| 2020/0294331 A1* | 9/2020 | Choi | G06N 20/10 |
| 2021/0011920 A1* | 1/2021 | Sudarsan | G06F 16/243 |
| 2022/0188627 A1* | 6/2022 | Hicks | G06N 3/063 |
| 2022/0188641 A1* | 6/2022 | Hicks | G06N 3/04 |
| 2023/0085991 A1* | 3/2023 | Liebman | G05B 23/0259 700/79 |

OTHER PUBLICATIONS

Bohrer, da Silveira et al. "Neuroevolution of Neural Network Architectures Using CoDeepNEAT and Keras", SBCB LAB—SBCB.INF.UFRGS.BR; arXiv preprint arXiv:2002.04634; Feb. 11, 2020, 29 pgs.

Chidambaran, S., et al. "Multi-criteria Evolution of Neural Network Topologies: Balancing Experience and Performance in Autonomous Systems"; In International Design Engineering Technical Conferences and Computers and Information in Engineering Conference vol. 51760; American Society of Mechanical Engineers; arXiv:1807.07979v1; Jul. 20, 2018; 13 pgs.

Sarigul, M. et al. "Q Learning Regression Neural Network"; Retrieved from http://openaccess.iste.edu.tr/xmlui/bitstream/handle/20.500.12508/702/mehmet-sar%C4%B1g%C3%BCl.pdf?; CTU FTS 2018; Rcd. Dec. 7, 2016; Revised and Accepted Oct. 16, 2018; 17 pgs.

Stork, Jorg et al. "Improving NeuroEvolution Efficiency by Surrogate Model-Based Optimization with Phenotypic Distance Kernels*"; In International Conference on the Applications of Evolutionary Computation; dated Feb. 9, 2019; 16 pgs.

* cited by examiner

REINFORCEMENT TESTING OF A NEURAL NETWORK

BACKGROUND

The present invention generally relates to neural networks and, more specifically, to reinforcement testing of a neural network.

Neuromorphic and synaptronic computation can be executed on artificial neural networks (ANNs) or convolutional neural networks (CNNs) to operate as computational systems that permit electronic systems to essentially function in a manner analogous to that of biological brains. Neuromorphic and synaptronic computation do not generally utilize the traditional digital model of manipulating "0"s and "1" s. Instead, neuromorphic and synaptronic computation create connections between processing elements that are roughly functionally equivalent to neurons of a biological brain. Neuromorphic and synaptronic computation may involve various electronic circuits that are modeled on biological neurons.

Neuro-evolution of augmenting topologies (NEAT) is a genetic algorithm (GA) for the generation of evolving ANNs and CNNs. NEAT alters weighting parameters and structures of networks and thereby attempts to find a balance between the fitness of evolved solutions and their diversity. NEAT is based on applying three key techniques in particular: tracking genes with history markers to allow crossover among topologies, applying speciation (the evolution of species) to preserve innovations and developing topologies incrementally from simple initial structures ("complexifying").

SUMMARY

Embodiments of the present invention are directed to a computer-implemented method of reinforcement testing of a neural network. A non-limiting example of the computer-implemented method includes creating a neural network including neurons to which actions are assigned in representation of test cases. Tests of various instantiations of the neural network are executed for each test case and a state of the neural network after each test is evaluated to determine a fitness score of a corresponding instantiation. Instantiations having fitness scores that exceed a predefined level and identified and the instantiations having the fitness scores that exceed the predefined level are selected for adjustments. The executing, the evaluating, the identifying and the selecting are iteratively repeated in order to obtain desired fitness scores.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a system in which tests are selected from a regression bucket as actions that a neural network can take and neuro-evolution of augmenting topologies (NEAT) is applied to create a fitness growth algorithm. This generally allows for creation of a pre-conditioned neural network (i.e., a randomly generated neural network), the application of the neural network to a problem, and the correlation of mutations to the neural network based off of fitness and uniqueness compared to other neural networks in the same genome. The system involves the assigning of fitness metrics and drivers, and letting the mutations generate driving test combinations from base sets with additional constraints added during training to adjust a desired result.

Artificial neural networks (or directly "neural networks") are machine learning models of multiple information-processing units called "neurons," which are connected in different fashions to represent and approximate mathematical functions. Based on human biology, these models aspired to mimic the capability of the human brain to organize its structural constituents, known as neurons, to perform certain computations (e.g., pattern recognition, perception and motor control) many times faster than the fastest digital computer in existence today.

In practice, the neurons (also called nodes) that constitute neural networks are simple representations of mathematical functions that process the inputs they receive and output a value. They include a set of synaptic weights, each representing a value to be multiplied by the input signal of each connection they are assigned to, a summing junction, usually a linear combiner that sums the weighted input signals from the connections and an activation function, which models the output signal of the neuron to a defined amplitude. A bias factor can be provided to either increase or decrease net input of the activation function, depending on whether it is positive or negative, respectively.

The interconnections of the signals inside neurons and between neurons can be easily represented as signal-flow graphs, where the neurons are usually defined as "nodes." The connections can take multiple forms and are ruled by the synaptic weights. The synaptic weights that regulate these connections are subject to adjustments through procedures called "learning algorithms" and represent the knowledge acquired during the learning process. The learning algorithms are constituted frequently by the act of exposing the model to data samples and modifying the synaptic weights as the model "learns" the patterns of the data. This procedure of exposing the model to data and evaluating its response is called supervised learning, the most common approach to "training" neural networks to date.

Figure 1:
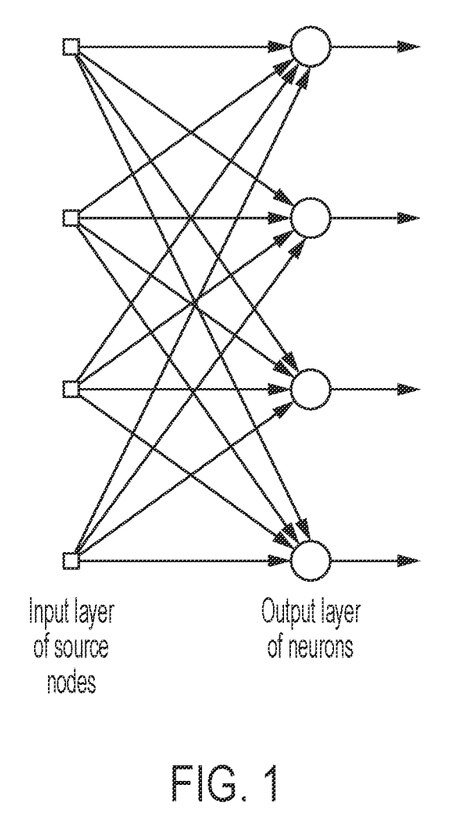
FIG. 1 illustrates a neural network including input and output layers of source nodes in accordance with one or more embodiments of the present invention.
Figure 2:
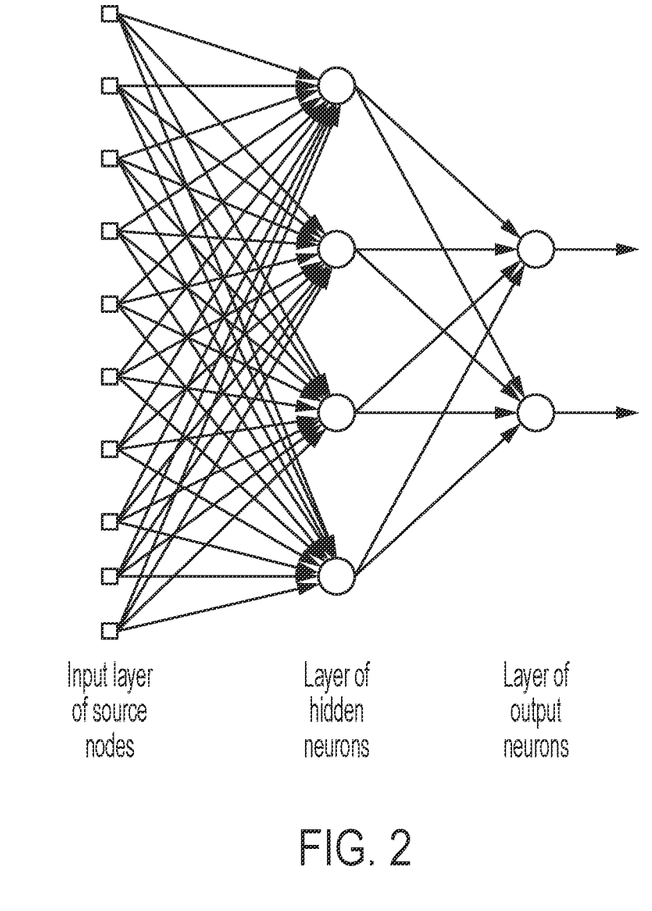
FIG. 2 illustrates a neural network including input and output layers of source nodes as well as a layer of hidden nodes in accordance with one or more embodiments of the present invention.

Network architectures resulting from the interconnection of nodes can be classified in multiple definitions, but the most important initial taxonomies for this study are the feedforward networks and the multilayer feedforward networks. Feedforward networks are simply networks organized in a way that input nodes directly connect to output nodes to produce output signals as in FIG. 1. Multilayered feedforward networks implement the same logic but include nodes in divisions called "layers," representing sets of nodes that connect to other layers. Intermediate layers are commonly addressed as "hidden layers." An example can be seen in FIG. 2, where the input nodes connect to an intermediate layer, which connects to the output layer.

From this initial notion of stacking layers was created, for example, the currently prevalent deep learning branch in the machine learning field. Deep learning architectures are commonly characterized by the connection of multiple layers of neurons in neural networks that take profit from extracting different levels of patterns in the input data with each layer. These architectures have been applied to fields including speech recognition, image classification, natural language processing, medical image analysis and more, in some cases reaching levels of confidence superior to those of human experts.

Neuro-evolution is a field of study dedicated to the generation and improvement of neural networks using evolutionary algorithms (EAs). Traditionally associated with the generation of neuron weights through evolution, current approaches associated with the field focus on multiple aspects of the construction of a network, such as learning their building blocks (activation functions), hyperparameters (learning rates), architectures (number of neurons per layer, number of layers, and which layers connect to which) and even the rules for learning themselves.

NEAT is an algorithm designed for neural network topology construction. NEAT uses a genetic algorithm structure to generate small initial networks that evolve and grow over generations by adding neurons and connections and adjusting their weights to generate structures capable of performing well while keeping them minimal in size. This minimalist aspect of NEAT is one of its core differences to other neuro-evolution algorithms, as it focuses on only adding neurons or connections when they have an active impact in the network's performance.

Starting with an initial population of small networks based on a common topology, NEAT evaluates changes to these networks iteratively by adding and removing neurons and connections across generations. The algorithm defines the genome that describes the nodes and connections by a mechanism called genetic encoding, used in the operations that modify the network structures through classic genetic algorithm operators such as crossover and mutations.

Mutation operators in NEAT work by adding nodes and connections or by disabling existing connections, avoiding changes that affect the functionality of the network. Crossover operators, on the other hand, are a much more complicated operation as it requires vast exchanges of genetic information that may cause resulting networks not to work correctly. To solve this, NEAT implements a historical markings mechanism, identifying nodes and connections with numerical identifiers. Parts of networks that share the same origin will share the same identifiers. Thus, the algorithm can recognize common structures in a simple way and exchange genetic information without generating defective networks.

Before applying crossover operations between networks, NEAT must ensure that the chosen networks are compatible to a certain degree. The algorithm manages this situation by applying a speciation technique to the population of solutions, dividing it in different species generated by similarity, allowing organisms to compete primarily within their niches instead of with the population at large. With this factor, different network topologies have a chance to evolve at their own pace instead of being instantly replaced by fast-converging networks that achieve better results in early generations.

DeepNEAT is an extension of NEAT that considers entire layers as genes instead of considering single neurons when forming structures. The focus now is to define compositions of layers instead of picking neurons and their connections one by one, generating larger and deeper networks suited to solving larger-scale problems than the ones NEAT was meant to solve in the past, while not minding indirect encoding and considering pre-established components like different types of layers. Similarly, to the original NEAT algorithm, DeepNEAT follows a standard genetic algorithm structure to find its solutions: it starts by creating an initial population of individuals, each represented by a graph, and evolves them over generations. During these generations, the individuals are recreated by adding or removing structural parts (nodes and edges) from their graphs through mutation, while keeping track of changes through a historical marking mechanism. Using the historical markings, chromosomes are compared in every generation using a similarity metric, being classified into subpopulations called species. Each species is evaluated by the shared fitness of its individuals, calculated by a fitness sharing function. This shared score is used to evaluate the quality of the species in each generation. Finally, the surviving species evolve separately from each other through crossovers (exchanging genetic information) among its constituent individuals, and the next generation takes place.

The changes to the main algorithm of NEAT in how nodes now represent layers imply additional aspects that must be considered when defining a layer in DeepNEAT: what is the type of layer (convolutional, dense, recurrent), the properties of the layer (number of neurons, kernel size, stride size, activation function) and how nodes connect. This is handled by considering a table of possible hyperparameters as the chromosome map for each node and an additional table of global parameters applicable to the entire network (such as learning rate, training algorithm, and data preprocessing). This makes the algorithm not only define topological information but diverse network configurations more broadly.

Regardless of the type of algorithms being run in conventional systems, it is typically the case that mutations and breeding operations are accomplished via human interaction with the system. That is, human select which genomes are bred and which mutations are input into the system.

One or more embodiments of the present invention address one or more of the above-described shortcomings of the prior art by providing a neural network characterized in that, over many genomes or iterations of breeding, the neural network will learn a system and will organically search out and test software, learning from all new testcases and regression buckets available and created in the future. This will require no human interaction with the system.

Figure 3:
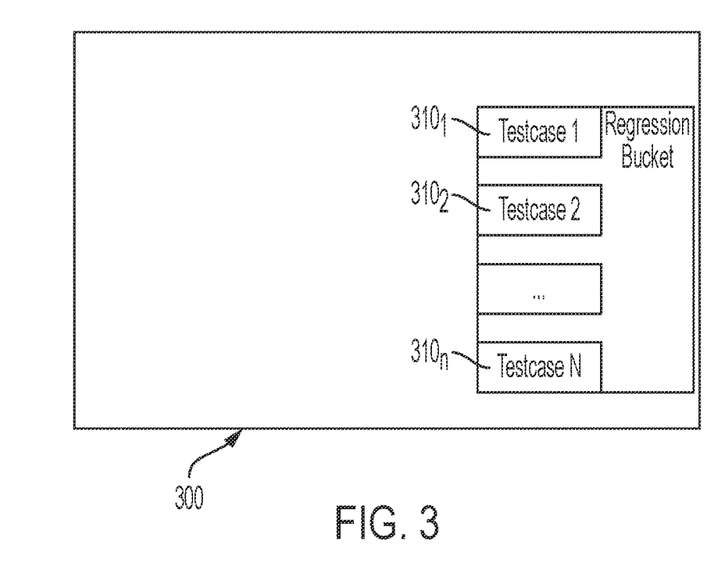
FIG. 3 is a graphical depiction of a system in which a neural network can be run in accordance with one or more embodiments of the present invention.
Figure 4:
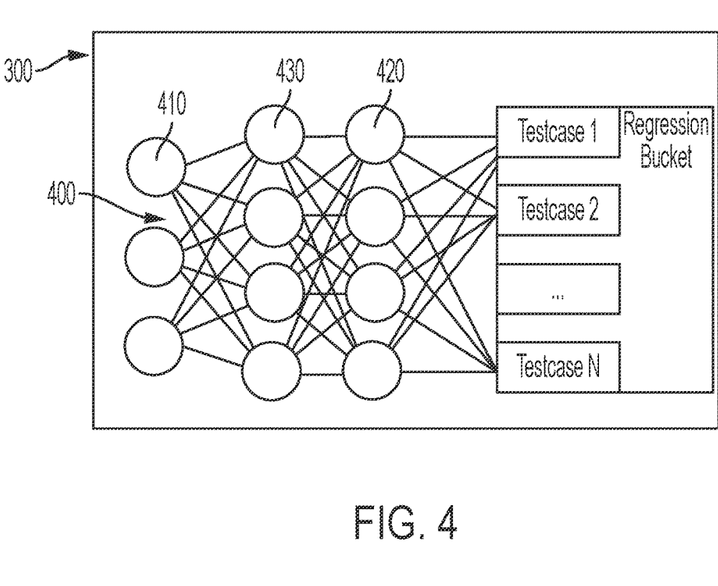
FIG. 4 is a graphical depiction of a neural network that is run on the system of FIG. 3 in accordance with one or more embodiments of the present invention.

Turning now to FIGS. 3 and 4, a system 300 in which a neural network 400 can be run is generally shown in accordance with one or more embodiments of the present invention. The system 300 includes a regression bucket 310 having multiple test case spaces $310_{1, 2, \ldots, n}$. The neural network 400 (see FIG. 4) is created for operation in the system 300 and can be provided as a random neural network that is configured to simulate a biological (i.e., human) brain. The neural network 400 includes multiple layers of neurons including, but not limited to, input neurons 410, output neurons 420 that are communicative with the multiple test case spaces $310_{1, 2, \ldots, n}$ and one or more layers of hidden neurons 430 that are communicatively interposed between the input neurons 410 and the output neurons 420. As shown in FIG. 4, each input neuron 410 is configured for direct communication with each hidden neuron 430, each hidden neuron 430 is configured for direct communication with each output neuron 420 and each output neuron is configured for direction communication with each test case space $310_{1, 2, \ldots, n}$. The input neurons 410, output neurons 420 that are communicative with the multiple test case spaces $310_{1, 2, \ldots, n}$.

The multiple test case spaces $310_{1, 2, \ldots, n}$ can be provided for addressing various types of questions and software of the input neurons 410, the output neurons 420 and the hidden neurons 430 can be programmed to answer some aspects of those questions. For example, the system 300 might be designed to determine whether a picture from a set of pictures is of a human or a tree. In such a case, the input neurons 410 might be programmed to identify whether a given picture has fleshy coloring, images of two arms, or one hand for each arm or five fingers for each hand, the hidden neurons 430 might be programmed to determine whether a picture has combinations of fingers, arms and fleshy coloring and the output neurons might be programmed to make a determination about combinations of characteristics that are indicative of a human or a tree. These determinations are then output to the corresponding test case spaces $310_{1, 2, \ldots, n}$.

While the input neurons 410, the output neurons 420 and the hidden neurons 430 have an overall formation and all have a similar type in FIGS. 3 and 4 (and in the other figures as well), it is to be understood that this is not required and that other formations and neuron types are possible. For example, the input neurons 410, the output neurons 420 and the hidden neurons 430 can be arranged in one or more of perceptron formations, feed forward formations, radial basis network formations, deep feed forward formations, recurrent neural network formations long/short term memory formations, gated recurrent unit formations, auto encoder formations, variational formations, denoising formations, sparse formations, Markov chain formations, Hopfield network formations, Boltzmann machine formations, restricted formations, deep belief formations, deep convolutional network formations, deconvolutional network formations, deep convolutional inverse graphics network formations, generative adversarial network formations, liquid state machine formations, extreme learning formations, echo state network formations, deep residual network formations, Kohonen network formations, support vector machine formations and neural Turing machine formations. Meanwhile, the input neurons 410 can be provided, for example, as one or more of input cells, backfield input cells and noisy input cells, the hidden neurons 430 can be provided, for example, as one or more of hidden cells, probabilistic hidden cells, spiking hidden cells, recurrent cells, memory cells, difference memory cells, kernel cells and convolutional or pool cells and the output neurons 420 can be provided, for example, as one or more of output cells and match input output cells.

Figure 5:
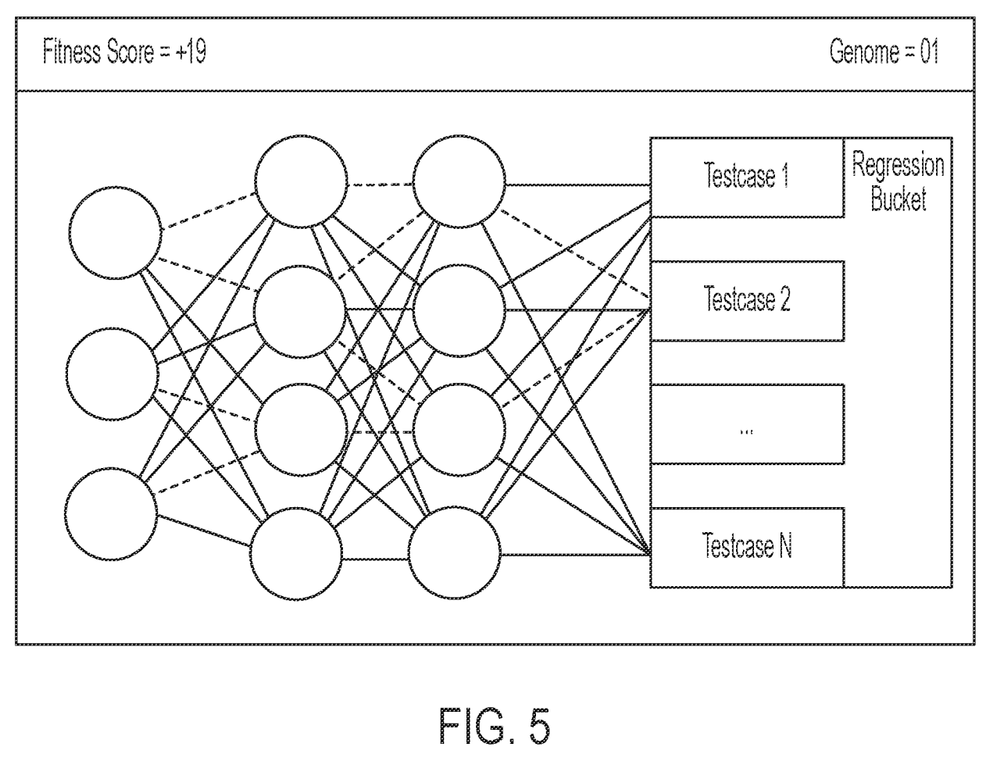
FIG. 5 is a graphical depiction of a test case run on the neural network of FIG. 4 in accordance with one or more embodiments of the present invention.

With reference to FIG. 5, the neural network 400 of FIG. 4 is executed while activation maps are strengthened and states of the system 300 under test are checked. In this way, the state of the system 300 or genome 501 after each test can be evaluated with a corresponding fitness score 502. The fitness score 502 is associated with the genome 501 and ranks the performance of the genome 501 in categories including, but not limited to, memory utilization and input/output (I/O) throughput. As a general rule, the lower the memory utilization and I/O throughput, the higher the fitness score 502.

Figure 6:
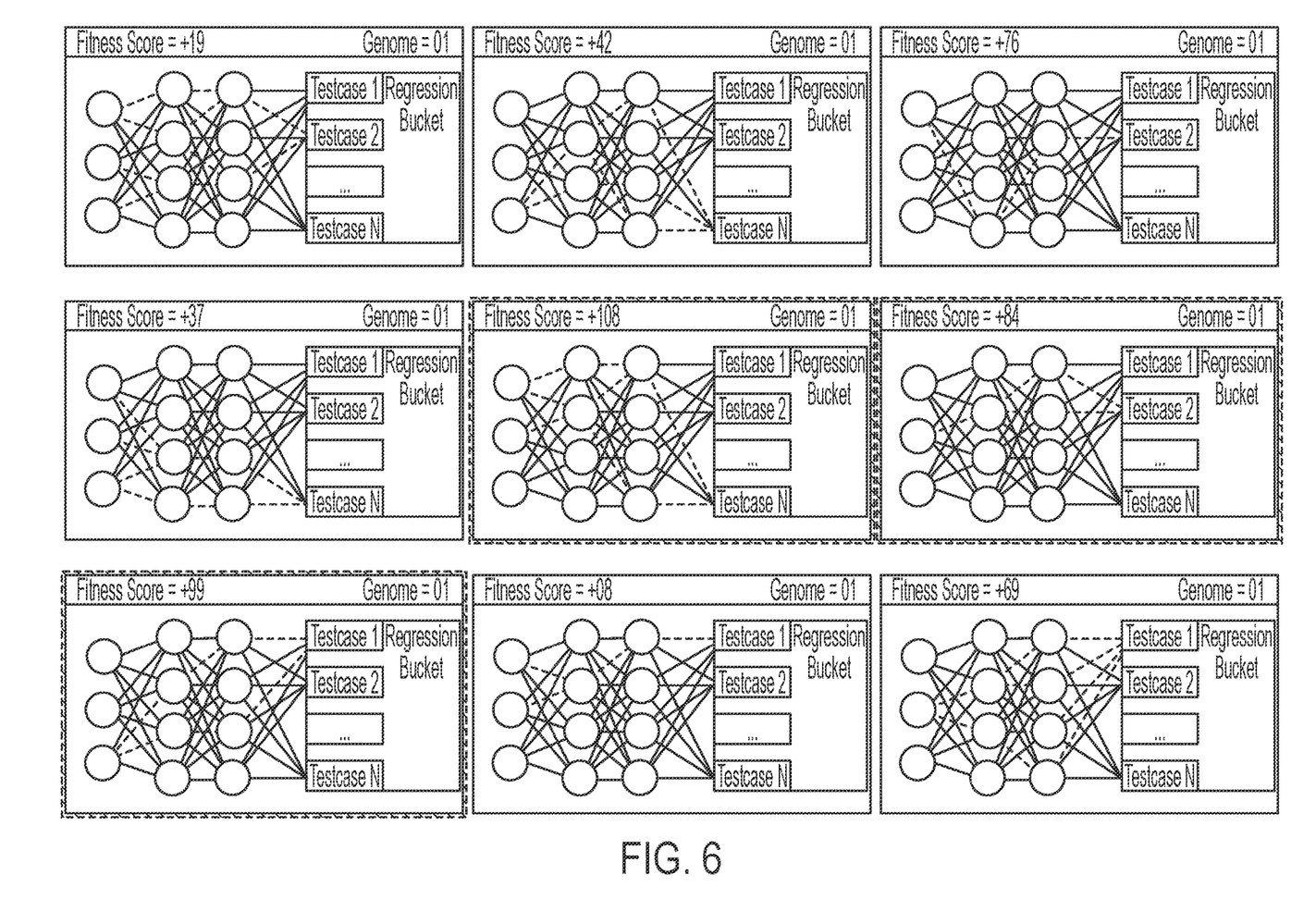
FIG. 6 is a graphical depiction of multiple test cases run on the neural network of FIG. 4 to determine which instantiations have highest fitness scores in accordance with one or more embodiments of the present invention.
Figure 7:
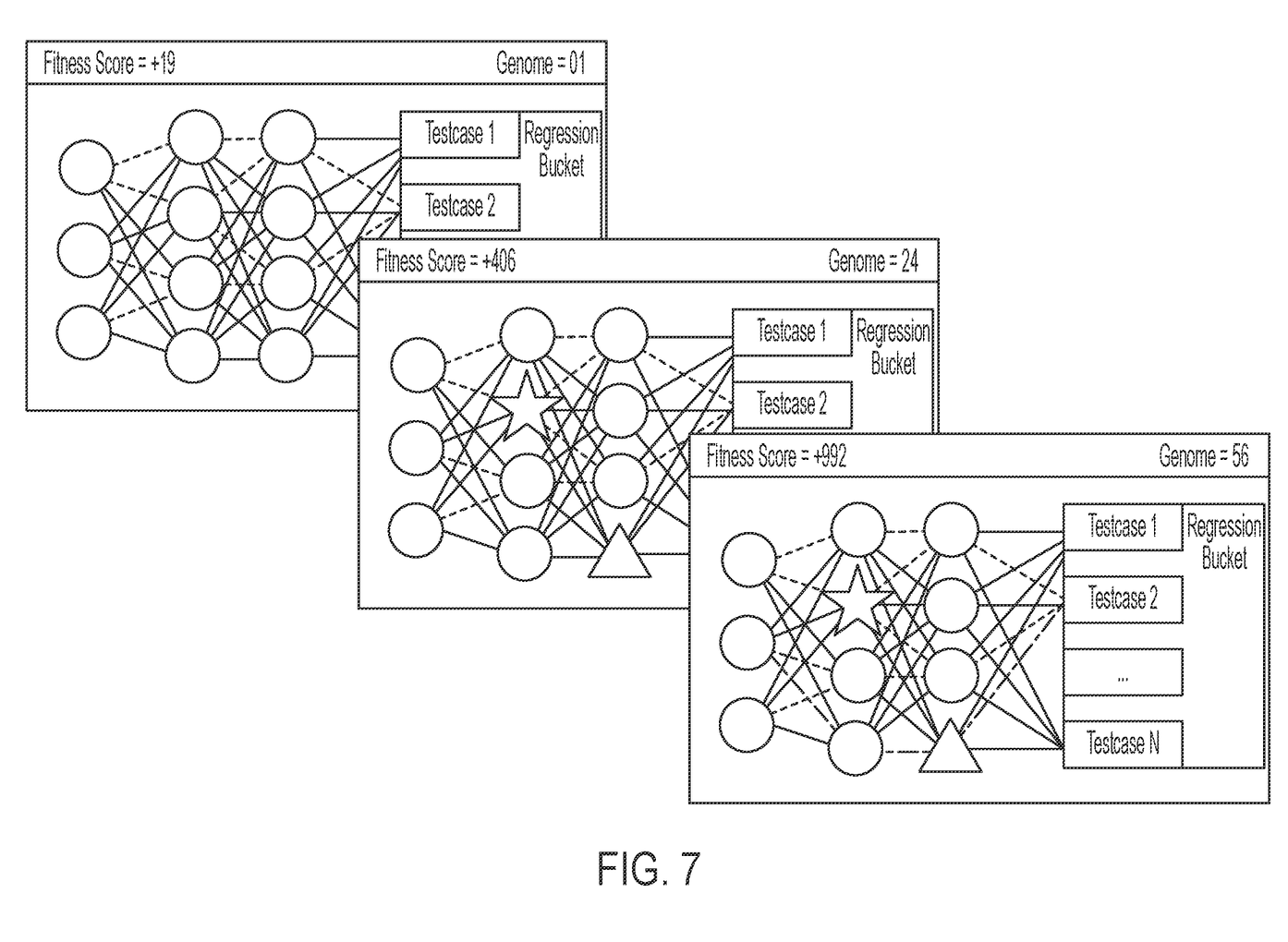
FIG. 7 is a graphical depiction of multiple test cases run on the neural network of FIG. 4 to illustrate mutations over time to obtain desired fitness scores in accordance with one or more embodiments of the present invention.

With reference to FIGS. 6 and 7, the top neural networks 400 will be selected for adjustments by, for example, breeding and mutation, in order to continue to refine their test performances and increase their fitness scores 502. Thus, over many genomes or iterations of breeding, the neural network 400 will learn the system 300 and organically search out and test software, learning from new test case spaces and regression buckets available and in the future. The adjustments (i.e., the breeding and/or the mutations) are executed automatically and without any human interactions being involved in the adjustments.

Figure 8:
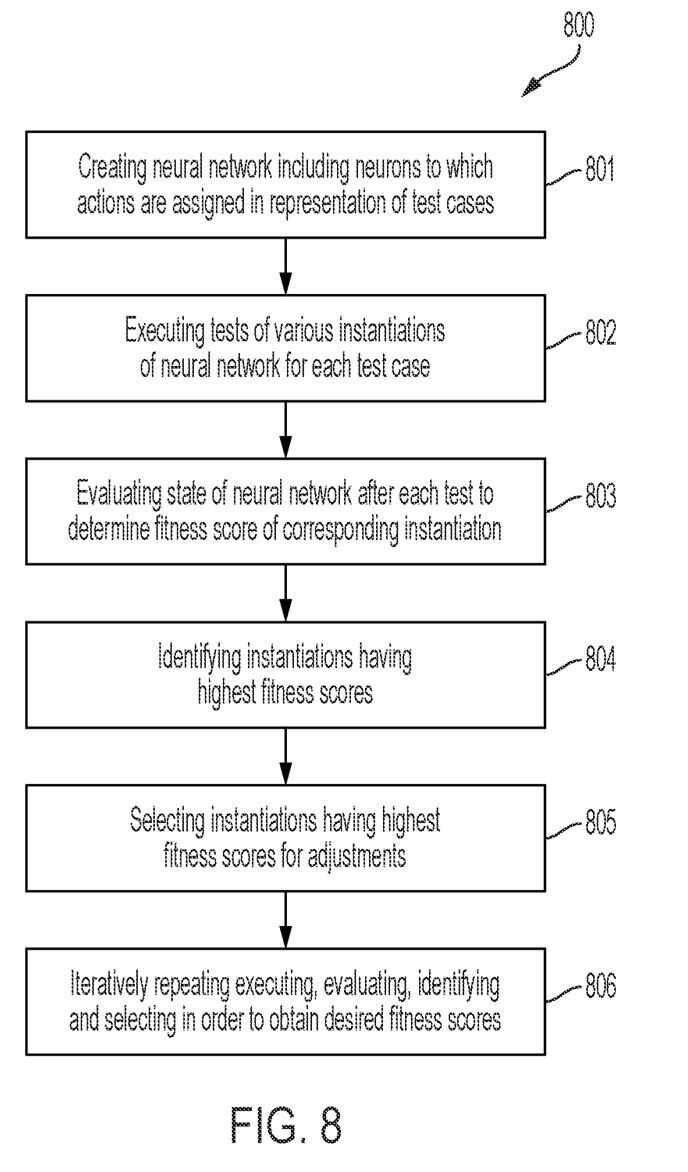
FIG. 8 is a flow diagram illustrating a method of reinforcement testing of a neural network in accordance with one or more embodiments of the present invention.

With reference to FIG. 8, a method of reinforcement testing of a neural network as described herein is provided. The method includes creating the neural network including neurons to which actions are assigned in representation of test cases (801), executing tests of various instantiations of the neural network for each test case (802), evaluating a state of the neural network after each test to determine a fitness score of a corresponding instantiation (803), identifying instantiations having highest fitness scores (804), selecting the instantiations having the highest fitness scores for adjustments (805) and iteratively repeating the executing, the evaluating, the identifying and the selecting in order to obtain desired fitness scores (806). The iteratively repeating of the executing, the evaluating, the identifying and the selecting of operation 806 continues until the fitness scores exceed a predefined level of the desired fitness scores. The adjustments are executed automatically and without any human interactions being involved in the adjustments.

Figure 9:
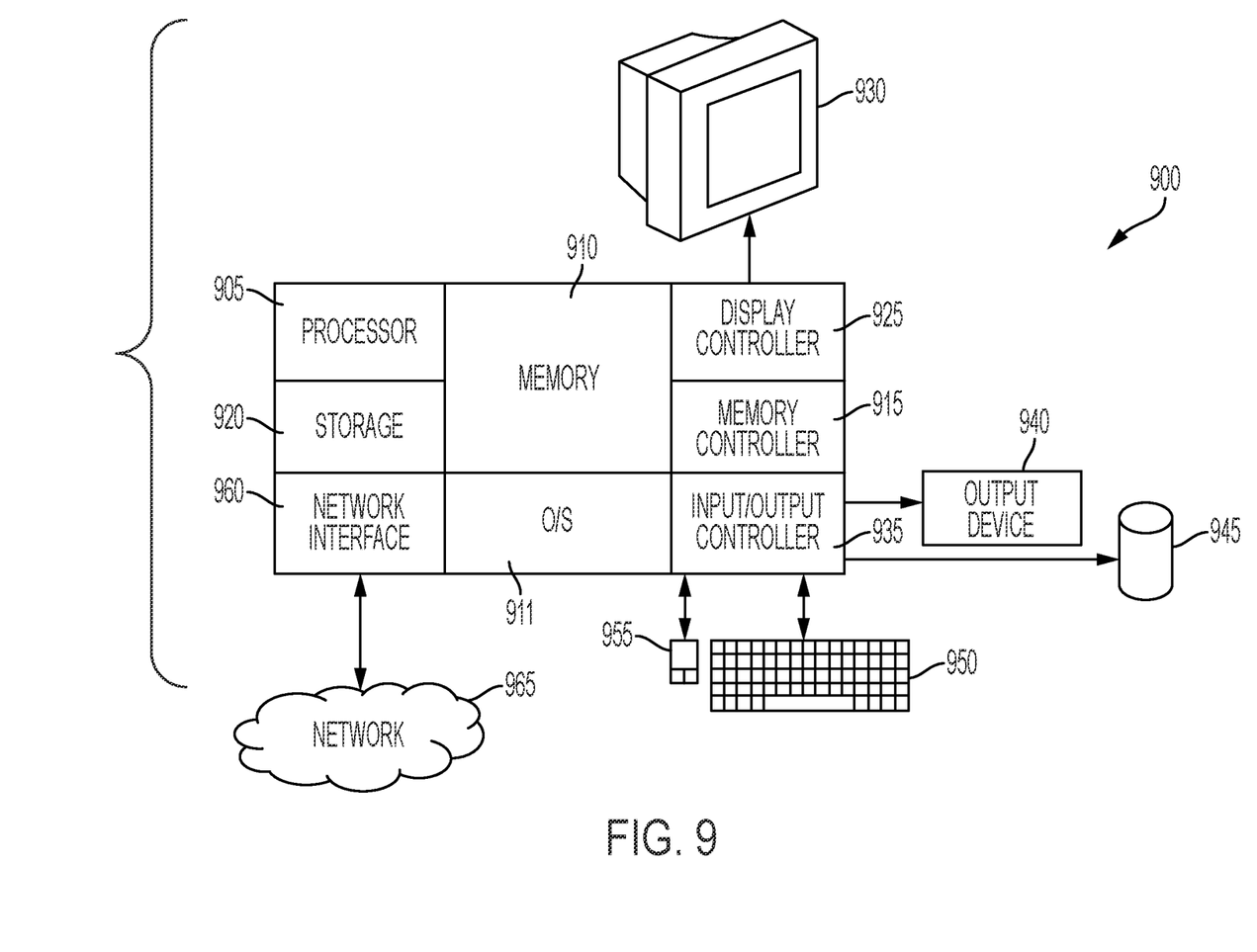
FIG. 9 depicts a computer system 400 for executing reinforcement testing of a neural network in accordance with one or more embodiments of the present invention.

Turning now to FIG. 9, a computer system 900 for reinforcement testing of a neural network is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 900 therefore may include general-purpose computer or mainframe 901 capable of running multiple instances of an O/S simultaneously.

In an exemplary embodiment, in terms of hardware architecture, as shown in FIG. 9, the computer 901 includes one or more processors 905, memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 935 may include a plurality of sub-channels configured to access the output devices 940 and 945. The sub-channels may include fiber-optic communications ports.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 form a suitable operating system (OS) 911. The operating system 911 essentially controls the execution of other computer programs and provides scheduling, input-output control, file and data management, memory management, and communication control and related services.

The memory 910 may include multiple logical partitions (LPARs) 912, each running an instance of an operating system. The LPARs 912 may be managed by a hypervisor, which may be a program stored in memory 910 and executed by the processor 905.

In an exemplary embodiment, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930. In an exemplary embodiment, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute instructions stored within the memory 910, to communicate data to and from the memory 910, and to generally control operations of the computer 901 pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of reinforcement testing of a neural network, the computer-implemented method comprising: creating the neural network, the neural network comprising neurons to which actions are assigned in representation of test cases; executing tests of various instantiations of the neural network for each test case; evaluating a state of the neural network after each test to determine a fitness score of a corresponding instantiation; identifying instantiations having fitness scores that exceed a predefined level; selecting the instantiations having the fitness scores that exceed the predefined level for adjustments; and iteratively repeating the executing, the evaluating, the identifying and the selecting in order to obtain desired fitness scores, wherein each test case is one of a guide to a likely outcome of a subsequent similar situation and a collection of criteria or variables used to determine whether an application or software system is working as intended, wherein the neurons comprise input neurons, output neurons and hidden neurons communicatively interposed between the input and output neurons and each neuron comprises synaptic weights, each representing a value to be multiplied by an input signal of connections they are assigned to, a summing junction that sums weighted input signals from the connections and an activation function that models an output signal of the neuron to a defined amplitude.

2. The computer-implemented method according claim 1, wherein the fitness score is indicative of memory utilization and input/output (I/O) throughput.

3. The computer-implemented method according to claim 1, wherein the adjustments comprise breeding of instantiations.

4. The computer-implemented method according to claim 1, wherein the adjustments comprise mutating instantiations.

5. The computer-implemented method according to claim 1, wherein the iteratively repeating of the executing, the evaluating, the identifying and the selecting continues until the fitness scores exceed a predefined level of the desired fitness scores.

6. A computer program product comprising a computer readable storage medium having program instructions embodied therewith, the program instructions executable by a processor to cause the processor to perform operations comprising:

creating the neural network, the neural network comprising neurons to which actions are assigned in representation of test cases; executing tests of various instantiations of the neural network for each test case; evaluating a state of the neural network after each test to determine a fitness score of a corresponding instantiation; identifying instantiations having fitness scores that exceed a predefined level; selecting the instantiations having the fitness scores that exceed the predefined level for adjustments;

and iteratively repeating the executing, the evaluating, the identifying and the selecting in order to obtain desired fitness scores, wherein each test case is one of a guide to a likely outcome of a subsequent similar situation and a collection of criteria or variables used to determine whether an application or software system is working as intended, wherein the neurons comprise input neurons, output neurons and hidden neurons communicatively interposed between the input and output neurons and each neuron comprises synaptic weights, each representing a value to be multiplied by an input signal of connections they are assigned to, a summing junction that sums weighted input signals from the connections and an activation function that models an output signal of the neuron to a defined amplitude.

7. The computer program product according claim 6, wherein the fitness score is indicative of memory utilization and input/output (I/O) throughput.

8. The computer program product according to claim 6, wherein the adjustments comprise breeding of instantiations.

9. The computer program product according to claim 6, wherein the adjustments comprise mutating instantiations.

10. The computer program product according to claim 6, wherein the iteratively repeating of the executing, the evaluating, the identifying and the selecting continues until the fitness scores exceed a predefined level of the desired fitness scores.

11. A system comprising: a memory having computer readable instructions; and one or more processors for executing the computer readable instructions, the computer readable instructions controlling the one or more processors to perform operations comprising: creating a neural network, the neural network comprising neurons to which actions are assigned in representation of test cases;

executing tests of various instantiations of the neural network for each test case;

evaluating a state of the neural network after each test to determine a fitness score of a corresponding instantiation; identifying instantiations having fitness scores that exceed a predefined level; selecting the instantiations having the fitness scores that exceed the predefined level for adjustments; and iteratively repeating the executing, the evaluating, the identifying and the selecting in order to obtain desired fitness scores, wherein each test case is one of a guide to a likely outcome of a subsequent similar situation and a collection of criteria or variables used to determine whether an application or software system is working as intended, wherein the neurons comprise input neurons, output neurons and hidden neurons communicatively interposed between the input and output neurons and each neuron comprises synaptic weights, each representing a value to be multiplied by an input signal of connections they are assigned to, a summing junction that sums weighted input signals from the connections and an activation function that models an output signal of the neuron to a defined amplitude.

12. The system according claim 11, wherein the fitness score is indicative of memory utilization and input/output (I/O) throughput.

13. The system according to claim 11, wherein the adjustments comprise breeding of instantiations.

14. The system according to claim 11, wherein the adjustments comprise mutating instantiations.

15. The system according to claim 11, wherein the adjustments comprise breeding of instantiations and mutating instantiations.

16. The system according to claim 15, wherein no human interaction is involved in the adjustments.

17. The system according to claim 11, wherein the iteratively repeating of the executing, the evaluating, the identifying and the selecting continues until the fitness scores exceed a predefined level of the desired fitness scores.

\* \* \* \* \*